United States Patent [19]

Leong

[11] 4,417,707
[45] Nov. 29, 1983

[54] HUMAN POWERED HANG GLIDER

[76] Inventor: Ken Leong, 201 Oakland Ave., #4, Oakland, Calif. 94611

[21] Appl. No.: 342,833

[22] Filed: Jan. 26, 1982

[51] Int. Cl.³ .................... B64C 33/00; B64C 31/02
[52] U.S. Cl. .................................. 244/11; 244/22; 244/64; 244/72; 244/DIG. 1
[58] Field of Search ............ 244/4 A, 11, 22, 28, 244/64, 72; 416/66, 69, 72, 67, 68, 81, 82, 83; 114/102

[56] References Cited

U.S. PATENT DOCUMENTS

| | | | |
|---|---|---|---|
| 919,834 | 4/1909 | Dressler | 244/11 |
| 1,013,152 | 1/1912 | Gammeter | 244/64 |
| 1,036,033 | 8/1912 | Twining | 244/64 |
| 1,052,199 | 2/1913 | Zeise | 244/64 |
| 1,068,332 | 7/1913 | Dressler | 244/64 |
| 1,506,624 | 8/1924 | Forchione | 244/64 X |
| 1,738,187 | 12/1929 | Krisch | 244/28 |
| 1,783,029 | 11/1930 | White | 244/72 |
| 2,244,444 | 6/1941 | Burgess | 244/64 |

FOREIGN PATENT DOCUMENTS

409336  4/1910  France .................. 244/11

*Primary Examiner*—Trygve M. Blix
*Assistant Examiner*—Rodney Corl
*Attorney, Agent, or Firm*—Willis E. Higgins

[57] ABSTRACT

A human powered hang glider (10) has a fixed wing portion (12) and a pair of movable wing portions (14, 16). Flexible sheet material (26, 28) is connected to trailing edges (30, 32) of the movable wing portions (14, 16). A support structure (34, 36) for the flexible sheet material (26, 28) overlies each flexible sheet material (26, 28). Elastic bands (52) and wires (74, 76) are connected in opposing relationship to the movable wing portions (14, 16) to allow reciprocation of the movable wing portions (14, 16). When the flexible bands (52) cause upward movement of the movable wing portions (14, 16) the flexible sheet members (26, 28) move away from their associated support structures (34, 36), allowing air to pass through the support structures (34, 36). When pilot (70 pulls on wires (74, 76) to move the movable wing portions (14, 16) downward, the flexible sheet portions (26, 28) move against their associated support structures (34, 36) to provide increased lift from the movable wing portions (14, 16). In a typical flight, these movements are performed occasionally, and the hang glider is otherwise launched, flown and landed in a conventional manner.

6 Claims, 6 Drawing Figures

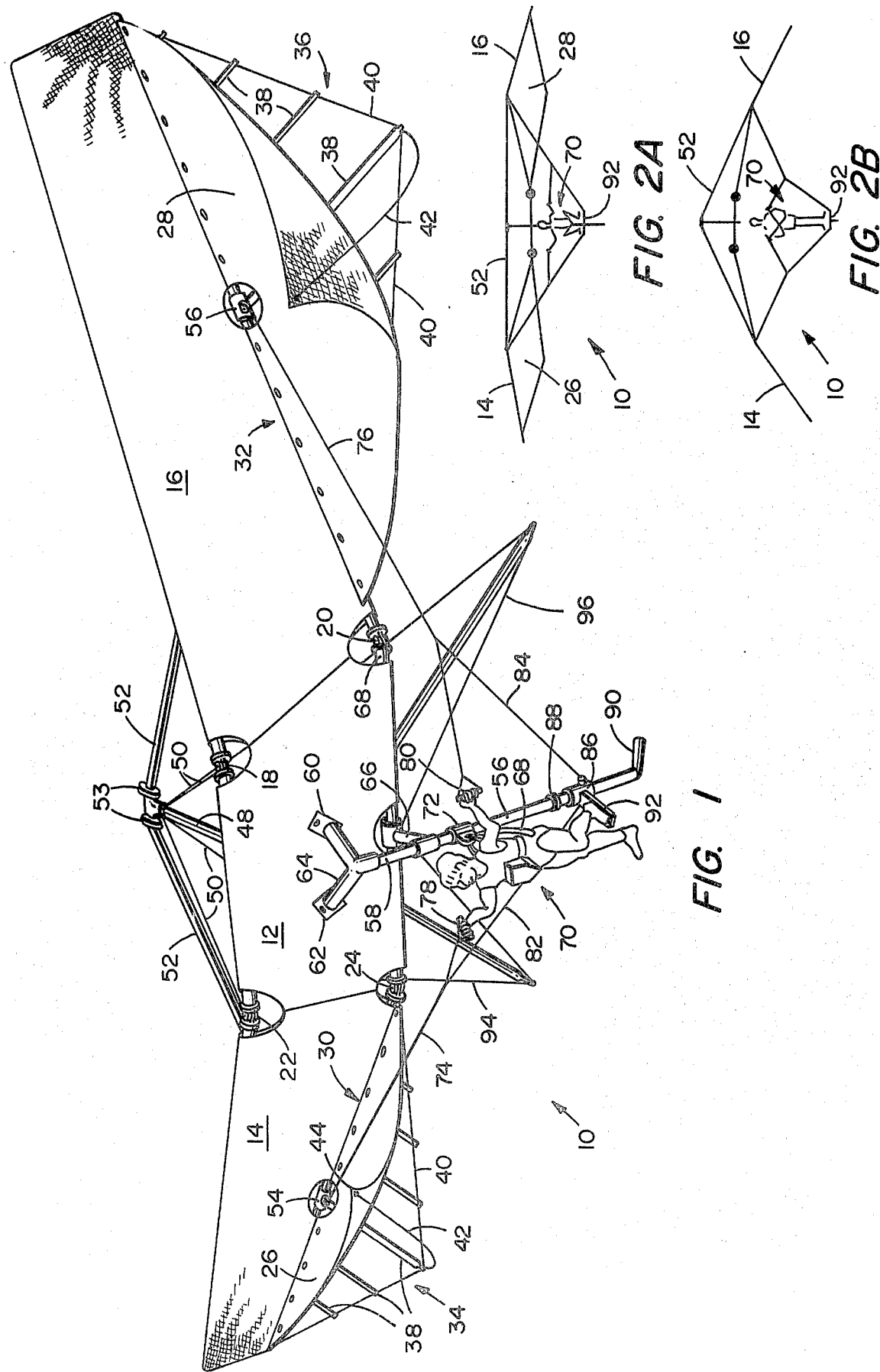

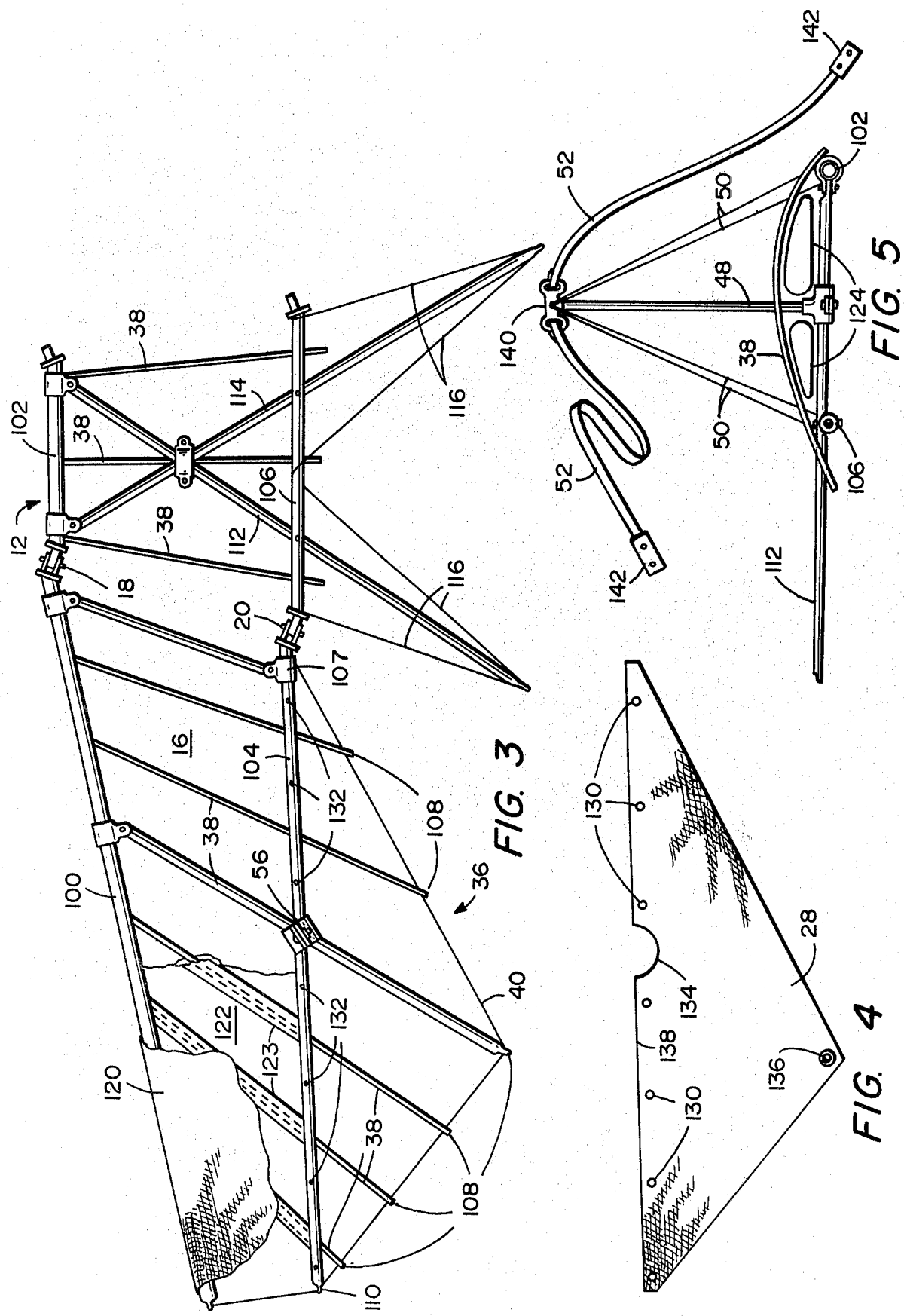

HUMAN POWERED HANG GLIDER

BACKGROUND OF THE INVENTION

1. Field of the Invention

This invention relates to an improved hang glider. More particularly, it relates to such a hang glider which is not dependent totally on upward moving air currents to provide lift for the hang glider. Most especially, it relates to such a hang glider which utilizes manually supplied force to provide lift in its operation.

2. Description of the Prior Art

Fixed wing hang gliders, such as those known as Rogallo wing type, are now well known. The state of the art of such hang gliders is exemplified by U.S. Pat. Nos. 4,116,406 and 4,116,407. Such hang gliders are dependent on air updrafts to maintain them airborne. For even the most skilled hang glider pilot, piloting such hang gliders involves locating and using such updrafts to postpone the inevitable descent to earth. In this respect, the operation of such hang gliders mimics part of the behavior of soaring birds. However, soaring birds also utilize occasional wing movement to give them lift, so that they are less dependent on air updrafts to maintain them airborne. Thus, these soaring birds can control their flight path, rather than be controlled by it.

The art of human powered flight has just now begun to achieve its first successes. For example, the "Gossamer Albatross" utilized a leg driven propeller, with a mechanism similar to that employed in a bicycle, to replace the internal combustion engine used to drive a propeller in a heavier aircraft. While that approach provided sufficient lifting force to enable the "Gossamer Albatross" to cross the English Channel, using human power to drive a propeller requires a pilot with superb physical conditioning, and the successful English Channel crossing was a physical ordeal for even such a pilot. The use of a human powered propeller for flight, therefore, appears to represent a barely achievable goal. For most sport flying, another approach to human powered flight is therefore indicated.

SUMMARY OF THE INVENTION

Accordingly, it is an object of this invention to provide a hang glider which will allow the pilot to mimic the flying action of soaring birds more completely.

It is another object of the invention to provide a hang glider with an airfoil that may be moved to provide lifting force.

It is a further object of the invention to provide such a hang glider in which the airfoil shape changes for movements that provide lifting force and for return movements.

It is still another object of the invention to provide a hang glider in which motive force for movable wings of the hang glider may be obtained from the pilot's extremities.

The attainment of the foregoing and related objects may be achieved through use of the novel human powered hang glider herein disclosed. This hang glider has a fixed wing portion with two laterally disposed sides. A pair of movable wing portions are each respectively attached to the side of the fixed wing portion, so that the fixed wing portion is centrally disposed with respect to the pair of movable wing portions. Each of the movable wing portions comprises an airfoil having a trailing edge. A pair of flexible sheet members are each respectively attached to the trailing edges of the movable wing portions. A support structure for the sheet members extends from the trailing edges of the movable wing portion. The support structure is constructed so that air may freely pass through the support structure. A means is connected to the movable wing portions to pivot them in a first direction. A biasing means is also connected to the movable wing portions to pivot them in a second direction opposed to the first direction when force from the manual force applying means is released. The flexible sheet members are movable away from the support structure when the movable wing portions are moved in one of the first and second directions. The flexible sheet members are movable into engagement with the support structure when the movable wing portions are moved in the other of the first and second directions.

A hang glider constructed in accordance with the invention allows a hang glider pilot to obtain lift by moving the movable wing portions periodically. The flexible sheet members and their support structure allows the movable wing portions to be moved in a manner closely analagous to that of large, soaring birds.

The attainment of the foregoing and related objects, advantages and features of the invention should be more readily apparent to those skilled in the art after review of the following more detailed description of the invention, taken together with the drawings, in which:

FIG. 1 is a perspective view of a hang glider in accordance with the invention, from a point below and in front of the device.

FIGS. 2A and 2B are front views of the hang glider shown in FIG. 1, showing its mode of operation.

FIG. 3 is a top view of the wing structure of the hang glider shown in FIG. 1.

FIG. 4 is a plan view of a portion of the wing structure in FIGS. 1 and 3.

FIG. 5 is a front view of another portion of the hang glider shown in FIG. 1.

DETAILED DESCRIPTION OF THE INVENTION

Turning now to the drawings, more particularly to FIG. 1, there is shown a preferred embodiment of a human powered hang glider 10 in accordance with the invention. The hang glider 10 has a fixed wing portion 12, centrally disposed with respect to a pair of movable wing portions 14 and 16, which are pivotally connected to the fixed wing portion 12 by joints 18, 20, 22 and 24. Flexible sheet members 26 and 28 are respectively connected to trailing edges 30 and 32 of the movable wing portions 14 and 16. Support structures 34 and 36 for the flexible sheet members 26 and 28 are formed from aluminum or other suitable lightweight metal rods 38 and taut wires 40. A tether 42 is connected to the tips 44 and 46 of the flexible sheet members 26 and 28.

Support rod 48 extends orthogonally upward from fixed wing portion 12, and is anchored by taut wires 50. Rubber or other suitable elastic material bands 52 are connected to the support rods 48 at 53 and to the movable wing portions 14 and 16 at 54 and 56, which points are approximately midway along the length of one of the rods 38 on each movable wing portion 14 and 16 (see also FIG. 3).

A pilot support member 56 extends downward and rearward from the fixed wing portion 12. End 58 of the pilot support member 56 is mounted to the fixed wing portion 12 at 60 and 62 by means of bracket 64. Rod 66 also fastens the pilot support member 56 to trailing edge 68 of the fixed wing portion 12. A harness 68 attaches pilot 70 to the pilot support member 56 by means of a collar 72, fixedly mounted to the support member 56. Cables 74 and 76 respectively have one end mounted to the points 54 and 56 of the movable wing portions 14 and 16. The other end of the cables 74 and 76 are connected to hand grips 78 and 80, respectively. Cables 82 and 84 respectively connect the cables 74 and 76 to collar 86, which is slidably mounted on the support member 56, between stop 88 and bend 90. Foot pedal 92 is fixedly mounted to collar 86. Tailpieces 94 and 96 are fastened to the trailing edge 68 of fixed wing portion 12.

In operation, the hang glider 10 of this invention is launched in a conventional manner. Advantage is taken of available air updrafts to fly the hang glider 10. However, in the absence of such updrafts, a pilot of this hang glider need not proceed with a descent and an immediate search for another thermal or another updraft. FIGS. 2A and 2B show how the movable wing portions 14 and 16 are moved by the pilot 70 to provide additional lift for the hang glider 10. In FIG. 2A, the movable wing portion 14 and 16 are shown at the upper end of a return movement. The flexible sheet material 26 and 28 attached to the trailing edges 30 and 32 are of the movable wing portions 14 and 16 (FIG. 1) extend downward away from their associated support structures 34 and 36, thus reducing the resistance from air against the upward movement of the movable wing portions 14 and 16.

When the movable wing portions 14 and 16 are moved downward to provide lift, the flexible sheet members 26 and 28 are forced against their associated support structures 34 and 36 by air impinging against the sheet members, thus increasing the amount of lift obtainable from downward motion of the movable wing portions 14 and 16. FIG. 2B shows the position of the movable wing portions 14 and 16 at the end of a downward stroke.

A comparison of the body position of the pilot 70 in FIG. 2A and FIG. 2B shows how the movements of the movable wing portions 14 and 16 are obtained. The pilot 70 bends his legs and extends his arms as shown in FIG. 2A to allow elastic bands 52 to raise the movable wing portions 14 and 16. The pilot 70 then crosses his arms across his chest and extends his legs against foot pedal 92 as shown in FIG. 2B to produce a downward stroke of the movable wing portions 14 and 16. In a typical flight with the hang glider 10, these motions need only be performed occasionally. Landing of the hang glider 10 is accomplished in a conventional manner.

FIG. 3 shows further details of construction of movable wing portion 16 and fixed wing portion 12. As shown, the support rods 38 extend from a heavier structural rod 100 or 102 on the leading edge of the fixed wing portion 12 and the movable wing portion 16 to a structural rod 104 or 106 on the trailing edge of the fixed wing portion 12 or movable wing portion 16. In the case of the movable wing portion 16, the support rods 38 extend beyond the trailing edge structural rod 104 to constitute part of the support structure 36 for flexible sheet material 28 (FIGS. 1 and 4). Taut wire 40 extends from one end of structural rod 104 along ends 108 of the support members 38 to the other end 110 of the trailing edge structural rod 104. In a similar manner, crossed rods 112 and 114 extend beyond trailing edge structural rod 106 of the fixed wing portion 12, and have taut wires 116 extending from the trailing edge structural rod 106, in order to provide support for tail members 94 and 96 (FIG. 1).

The wing structures shown in FIG. 3 are covered with a suitable fabric, such as dacron or nylon, as indicated at 120 and 122. As shown, the fabric is desirably provided in the two layers 120 and 122, one on each side of the structural members, as is conventional in hang glider construction. If desired, only a single layer of fabric could be employed to define the wing air foil structure, which is also conventional in hang glider construction. Further, if desired, sealed lighter-than-air gas bags 124 (FIG. 5) may be provided between the fabric layers 120 and 122 and within the structure of wing portions 12, 14 and 16 as an aid to buoyancy. Ballast may also be provided if desired to give control of buoyancy. The fabric layers may be sewn on either side of the support rods 38 to provide a pocket 123 in a manner similar to the pockets for battens on sails.

FIG. 4 shows the construction of flexible sheet material 28, which interacts with the support structure 36 in operation of this invention. The flexible sheet material 28 has a row of grommets 130 along the hypoteneuse of its triangular shape, for attaching the flexible sheet material 28 to trailing edge structural member 104 with pins or ring hooks 132 (FIG. 3). A generally semi-circular opening 134 is provided in the flexible sheet material 28 as shown, in order to allow access for fastening wire 76 (FIG. 1) to movable wing portion 16 at 56 (FIGS. 1 and 3). A grommet 136 is also provided opposite to the hypoteneuse 138 for fastening the tether 42 for limiting the extent of movement of flexible sheet member 28 away from its associated support structure 36 (FIG. 1).

FIG. 5 shows details of the elastic bands 52 and their associated support structures. Support rods 38 extend between leading edge structural rod 102 and trailing edge structural rod 106 to aid in defining the air foil structure. Vertical support rod 48 extends upward from the intersection of intersecting rods 112 and 114 (see also FIG. 3). One end of each elastic band 52 is connected to fixture 140 as shown, and the other end 142 of each flexible band 52 is connected to one of the movable wing portions 14 or 16 at the point 54 or 56 (see also FIG. 1). The taut wires 50 are connected between the fixture 140 and either the leading edge structural rod 102 or the trailing edge structural rod 106 to anchor the vertical support 48 for the elastic bands 52.

It should now be apparent to those skilled in the art that a novel human powered hang glider capable of achieving the stated objects of the invention has been provided. This hang glider may be used to mimic both the soaring action and the wing movement action of large soaring birds. As a result, the hang glider pilot is given an additional source of lift to the updrafts employed with conventional hang gliders. More pilot control over flight paths, without sacrificing elevation, is therefore provided.

It should further be apparent to those skilled in the art that various changes in form and details of the invention as shown and described may be made. It is intended that such changes be included within the spirit and scope of the claims appended hereto.

What is claimed is:

1. A hang glider, comprising a fixed wing portion having two laterally disposed sides, a pair of movable wing portions, each respectively pivotally attached to the sides of said fixed wing portion, each of said movable wing portions comprising an air foil having a trailing edge, a pair of flexible sheet members each respectively attached to the trailing edges of said movable wing portions, a support structure, through which air may freely pass, for the flexible sheet members, means connected to said movable wing portions to pivot said wing portions in a downward direction, biasing means connected to said movable wing portions to pivot said wing portions in an upward direction opposed to the downward direction when force from said manual force applying means is released, said flexible sheet members being movable away from said support structure when said movable wing portions are moved in the upward direction and movable into engagement with said support structure when said movable wing portions are moved in the downward direction, said support structure comprising a plurality of frame members extending rearwardly away from the trailing edge of each of said movable wing portions and an edge member extending between each of the frame members, each of said support structures so formed being substantially co-extensive with one of said flexible sheet members when one of said flexible sheet members is in engagement with said support structure.

2. The hang glider of claim 1 additionally comprising a tether connected to each of said flexible sheet members to limit the extent of movement of said flexible sheet members away from said support structure.

3. The hang glider of claim 1 in which the edge member of each support structure is a taut wire.

4. The hang glider of claim 1 in which said force applying means comprises a pair of handles, each respectively connected by a cable to one of said pair of movable wing portions.

5. The hang glider of claim 4 in which said force applying means further comprises a foot pedal mounted for movement away from said movable wing portions, said foot pedal being coupled to each of said movable wing portions by cables.

6. The hang glider of claim 4 in which biasing means comprises a spring member connected to each of said movable wing portions on a side of the wing portions opposite to a side to which the cable is connected.

* * * * *